Patented Aug. 14, 1945

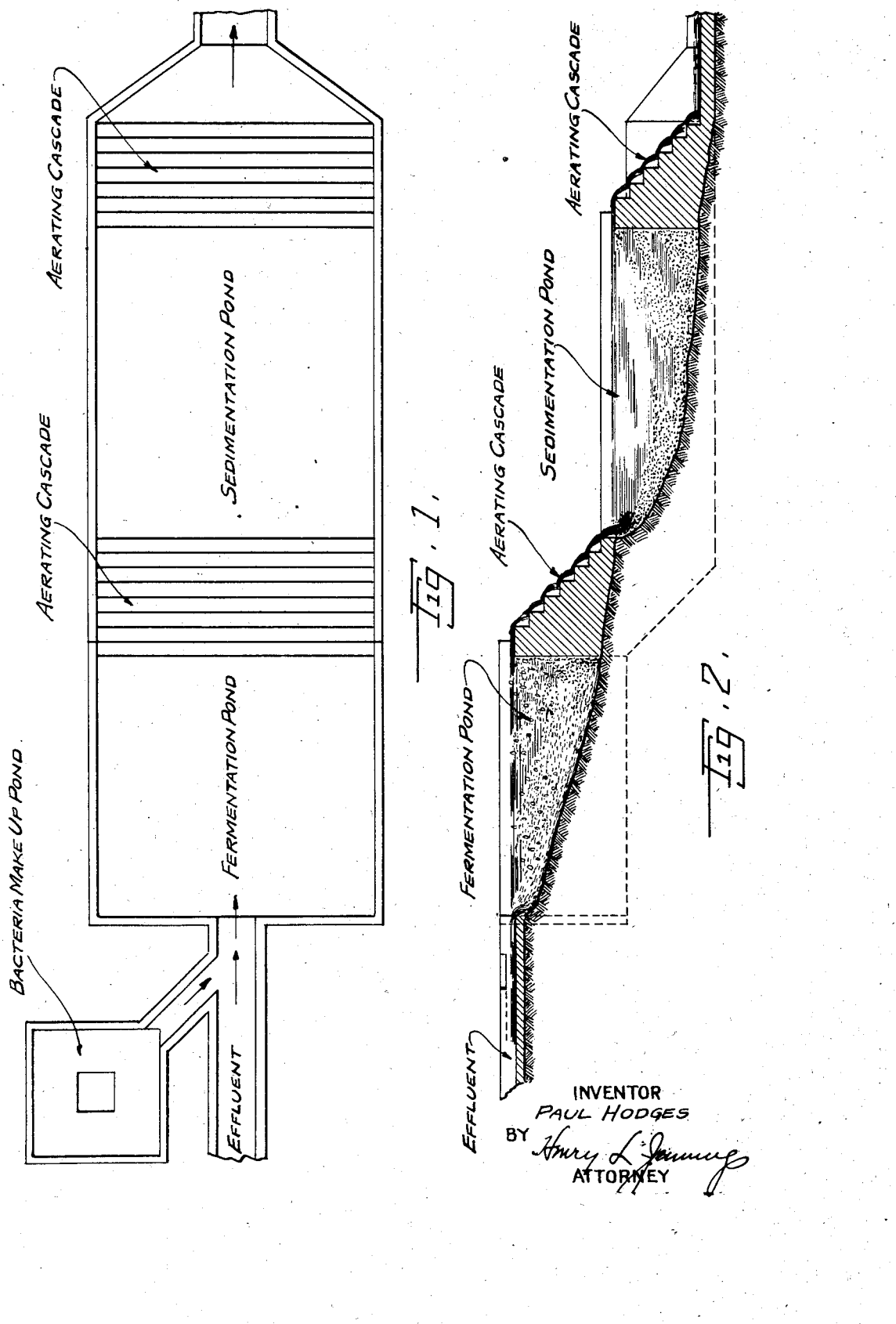

2,382,010

UNITED STATES PATENT OFFICE 2,382,010

PROCESS FOR THE TREATMENT OF PAPER MILL EFFLUENT

Paul Hodges, Crossett, Ark.; Lillian F. Hodges administratrix of said Paul Hodges, deceased Application January 19, 1942, Serial No. 427,378

9 Claims. (Cl. 210—2)

My invention relates to the treatment of the effluent from alkaline or kraft pulp or paper mills, and has for an object the provision of a simple, economical process for such treatment, which shall render the effluent substantially harmless to streams in which it may be discharged with respect to potability, appearance, plant life or animal and aquatic life.

A further object of my invention is to provide an economical process for the treatment of the dilute black liquor containing effluent from sulphate process paper mills, which shall be effective to destroy the cellulose content of the effluent and bring about an acid reaction which causes the lignin, fatty acids, and resins of the black liquor to separate out, thus clarifying and purifying the effluent and rendering it safe for animal and plant life.

A still further object of my invention is to provide a process for the treatment of the black liquor containing effluent from a sulphate process paper mill which shall be effective to clarify the effluent, remove harmful compounds therefrom, and which shall include the addition of oxygen thereto so that it will support aquatic life.

As is well known in the art to which my invention relates, the effluent from sulphate paper mills is highly injurious to streams and its disposal has become a major industrial problem. The so-called "sulphate soap" which accompanies the black liquor content in the effluent is highly toxic to aquatic life, as little as five parts per million being sufficient to kill fish. As is also well known, the major part of the black liquor from the digesters in a sulphate process paper mill is separated from the pulp after cooking, and is evaporated down to reduce the water content. It is then burned to furnish heat and to recover the soda content which is used for cooking succeeding batches of wood. Considerable black liquor necessarily remains in the pulp after this operation, which black liquor is washed out and the resulting wash water must be disposed of. This wash water is further diluted by boiler blowdown water and other paper mill wastes, and constitutes the highly objectionable, toxic effluent which my process renders harmless.

The black liquor and sulphate soap in the effluent contain sodium lignate, sodium resinate, sodium oleate, sodium hydroxy valerate, and sodium salts of other lactone and sugar acids. The effluent also contains calcium carbonate, pulp fiber, raw and partially cooked chips, bleachery wastes, and other waste products of the mill.

In accordance with my process, I inoculate the effluent with cellulose destroying micro-organisms, such as yeast, anaerobic bacteria, such as Actinomyces, or the cellulose destroying bacteria contained in ordinary barnyard manure and rotted wood. A culture such as described destroys the cellulose and lactone acids in the effluent, producing other acids or acid gases, such as carbon dioxide. The acids thus formed neutralize the alkaline salts of the black liquor and cause a precipitation of the lignin, resins, and fatty acids in the effluent. In this reaction, the maximum evolution of $CO_2$ is desired in order to neutralize the sodium compounds, forming sodium bicarbonate, and to precipitate the lignin and fatty acids. After the precipitation of these materials, the effluent may be clarified by any suitable means, such as filtration, sedimentation, centrifugal force, or other mechanical separation of the solids, to form a greatly improved product, so far as potability, color, appearance and effect on aquatic life is concerned.

It is also contemplated, in accordance with my process, to add oxygen to the treated effluent so as to render it more adaptable to support fish life. This may be accomplished by means of aeration, plant life, algae, or chemical treatment.

The single sheet of drawing hereto annexed and forming a part of this application illustrates diagrammatically in Fig. 1 the plan view of a typical means for carrying out my improved process, and in Fig. 2 a longitudinal sectional view.

By way of example, and referring to the drawing, the following description sets forth the process employed by me in treating the effluent from a 100 ton sulphate process pulp and paper mill, the effluent of which consisted of wash water, black liquor, pulp fiber, sulphate soap, partially cooked chips, alum solution, boiler blowdown, and other wastes. I first provide two connecting treatment ponds or reservoirs, one of which is indicated on the drawing as a fermentation pond, and the other a sedimentation pond, through which the effluent flows on its way to final discharge into a sewer or stream. While the process may be carried out by providing only one treatment pond, for reasons which will be apparent, I prefer to employ two, each of which should have a minimum capacity sufficient to accommodate the effluent from a twenty-four hour operation of the mill, that much time being required to complete the destruction of the cellulose and precipitate the lignin and fatty and resinic acids from the effluent.

Where sufficient space is available I prefer to make these ponds much larger than indicated, for the reason that the longer the effluent is treated in accordance with my process, the more satisfactory the results. The effluent from the mill is run continuously into the fermentation pond while the mill is in operation. I provide also a micro-organism makeup pond which discharges continuously into the stream of effluent on its way to the fermentation pond. In the micro-organism makeup pond I may provide 50 pounds of potatoes and one pound of baker's yeast, which may be replenished as used up. I have found that this provides a constant supply of micro-organisms sufficient to act upon the fiber, partially cooked chips, and lactonic acids of the black liquor, destroying them with the evolution of carbonic and other acids. The acids thus formed in turn neutralize the sodium lignate, sodium resinate, and sodium oleate of the black liquor and sulphate soap, and precipitate lignin, resins, and oleic acids in the fermentation pond.

By the time the body of effluent reaches the discharge end of the fermentation pond, the reaction is complete and the major portion of the solids are settled out. Leaving the fermentation pond, the effluent passes over an aerating cascide into the sedimentation pond, where the final settling out of solids occurs. The clarified effluent then passes over a second cascade dam for further aeration before being discharged into a stream. Plant life or algae is preferably provided in the sedimentation pond to further increase the oxygen content of the effluent before it is finally discharged, in order that it may be better adapted to support fish life.

Where readily obtainable, I prefer to add other cellulose destroying micro-organisms to the effluent on its way to the fermentation pond. For this purpose, *Clostridium dissolvens*, Actinomyces, or the cellulose destroying micro-organisms of common barnyard manure and from rotted wood may be employed. It is particularly important that the micro-organisms be constantly added to the effluent as it enters the fermentation pond because, I have found, by the time the effluent has reached the outlet to the sedimentation pond, the micro-organisms have died. The moving stream of effluent carries the micro-organisms down with it, and in order to keep the upper end of the fermentation pond inoculated, micro-organisms must be constantly added.

Where the paper mill employing my process has a bleaching plant, it will be found to be an aid, rather than a detriment, to the carrying out of the process. The effluent after being partially clarified in the fermentation pond as hereinbefore described, may have added thereto the bleachery waste containing calcium chloride and traces of hypochlorite. The calcium chloride precipitates as calcium lignate any remaining sodium lignate in solution, and the hypochlorite material reduces the oxygen demand of the solution. The precipitate formed by this reaction is then allowed to settle out in the sedimentation pond. Obviously the fermentation pond and sedimentation pond will gradually accumulate solids and must be cleaned out at intervals, depending upon their original capacities. As before remarked, where land is available, it is preferable to employ large ponds for the collection and treatment of the effluent, as such afford a greater time for treatment, a greater opportunity for clarification and the settling out of precipitated solids, and the addition of oxygen to the effluent. Also, as is obvious, such ponds require less frequent cleaning.

While I have described my invention specifically as treating the effluent from a so-called "sulphate process" paper mill, it will be well understood by those skilled in the art to be equally effective in treating the similar alkaline effluent from a so-called "soda process" paper mill. For example, as set forth in "The Manufacture of Pulp and Paper," volume III, published by the McGraw-Hill Book company, in section V, page 1: "There are two principal processes for making alkaline pulp, frequently referred to as the Alkaline processes. Both processes depend upon the dissolving action of caustic soda on the non-fibrous matter in wood. Hence, much that can be said of one process can be said in equal force and in the same language of the other. When referred to separately, one is called the Soda process and the other the Sulphate process."

While I have described but one form of my invention, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. The method of treating the dilute alkaline black liquor containing effluent from a paper mill which comprises passing it through a storage reservoir having a capacity sufficient to hold at least the total effluent from a 24 hour run of the mill, and inoculating the effluent as it enters the reservoir with liquor containing cellulose and lactone acid destroying microorganisms having the property of producing carbon dioxide and other acidic substances and thereby causing the precipitation of lignin, fatty acids and resins from the effluent.

2. The method of treating the dilute alkaline black liquor containing effluent from a paper mill which comprises passing it through a storage reservoir having a capacity sufficient to hold at least the total effluent from a 24 hour run of the mill, inoculating the effluent as it enters the reservoir with liquor containing cellulose and lactone acid destroying microorganisms having the property of producing carbon dioxide and other acidic substances and thereby causing the precipitation of lignin, fatty acids and resins from the effluent, clarifying the thus treated effluent, and adding oxygen thereto.

3. The method of treating the dilute alkaline black liquor containing effluent from a paper mill which comprises passing it through a storage reservoir having a capacity sufficient to hold at least the total effluent from a 24 hour run of the mill, inoculating the effluent as it enters the reservoir with liquor containing cellulose and lactone acid destroying microorganisms selected from those found in yeast, barnyard manure and rotted wood and having the property of producing carbon dioxide and other acidic substances and thereby causing the precipitation of lignin, fatty acids and resins and clarifying the thus treated effluent, and adding oxygen thereto.

4. The method of treating the dilute alkaline black liquor containing effluent from a paper mill which comprises passing it through a storage reservoir having a minimum capacity sufficient to hold the total effluent from a 24 hour run of the mill, inoculating the effluent as it enters the reservoir with liquor containing the microorganisms found in yeast and other cellulose and sugar destroying organisms having the property of producing carbon dioxide and other acidic substances and thereby causing the precipitation of lignin, fatty acids and resins and clarifying the effluent, adding a coagulant to the thus treated effluent to further clarify it, and adding oxygen thereto.

5. The method of treating the dilute alkaline black liquor containing effluent from a paper mill which comprises passing it through a storage reservoir having a minimum capacity sufficient to hold the total effluent from a 24 hour run of the mill, inoculating the effluent as it enters the resvoir with liquor containing the microorganisms found in yeast and other cellulose and sugar destroying organisms having the property of producing carbon dioxide and other acidic substances and thereby causing the precipitation of lignin, fatty acids and resins and clarifying the effluent, adding calcium chloride to the thus treated effluent to further clarify it, and aerating to increase the oxygen content thereof.

6. The method of treating the dilute alkaline black liquor containing effluent from a paper mill which comprises passing it through a storage reservoir having a minimum capacity sufficient to hold the total effluent from a 24 hour run of the mill, inoculating the effluent as it enters the reservoir with liquor containing the microorganisms found in yeast and other cellulose and sugar destroying organisms having the property of producing carbon dioxide and other acidic substances and thereby causing the precipitation of lignin, fatty acids and resins and clarifying the effluent, adding calcium chloride to the thus treated effluent to further clarify it, separating the clarified effluent from the precipitate, and aerating to increase the oxygen content thereof.

7. The method of treating the dilute alkaline black liquor containing effluent from a paper mill which comprises conducting the effluent through a storage reservoir having a capacity sufficient to hold at least the effluent from a 24 hour run of the mill, inoculating the effluent as it enters the reservoir with liquor containing the microorganisms found in yeast, allowing the lignin, fatty acids and resins to precipitate, separating the thus treated effluent from the precipitate and aerating it to add oxygen thereto, conducting the thus clarified effluent through a second storage reservoir, adding further oxygen adding agents thereto, allowing the effluent to go to waste, aerating the effluent as it goes to waste, and periodically removing precipitated substances from the reservoirs.

8. The method of purifying the alkaline black liquor containing effluent from a sulphate process paper mill which comprises passing the effluent in sequence through a plurality of treatment reservoirs the first of which in the series has a minimum capacity sufficient to accommodate the effluent resulting from 24 hours operation of the mill, continuously adding liquor containing the microorganisms found in yeast to the effluent entering the first reservoir in the series to bring about a neutralization of the alkaline compounds in the effluent and a precipitation of the lignin and fatty acids, aerating the effluent as it passes from one reservoir to another to add oxygen thereto, adding plant life to the effluent before its final discharge to further increase the oxygen content thereof, further aerating before final discharge, and periodically removing precipitated material from the reservoirs.

9. The method of purifying the alkaline black liquor containing effluent from a sulphate process paper mill which comprises passing the effluent in sequence through a plurality of treatment reservoirs, the first of which in the series has a minimum capacity to accommodate the effluent resulting from 24 hours operation of the mill, continuously adding liquor containing the microorganisms found in yeast to the effluent entering the first reservoir in the series to bring about a neutralization of the alkaline compounds in the effluent and a precipitation of the lignin and fatty acids, aerating the effluent as it passes from one reservoir to another to add oxygen thereto, and adding bleachery waste containing calcium chloride and calcium hypochlorite, and interposing plant life in the effluent in one of said reservoirs after the first in the series to increase the oxygen content thereto before final discharge.

PAUL HODGES.